(12) United States Patent
Rajagopalan et al.

(10) Patent No.: US 10,813,194 B2
(45) Date of Patent: Oct. 20, 2020

(54) NOISE-FLOW MONITORING AND SOUND LOCALIZATION VIA INTELLIGENT LIGHTING

(71) Applicant: SIGNIFY HOLDING B.V., Eindhoven (NL)

(72) Inventors: Ruben Rajagopalan, Eindhoven (NL); Harry Broers, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/614,104

(22) PCT Filed: May 4, 2018

(86) PCT No.: PCT/EP2018/061562
§ 371 (c)(1),
(2) Date: Nov. 15, 2019

(87) PCT Pub. No.: WO2018/210588
PCT Pub. Date: Nov. 22, 2018

(65) Prior Publication Data
US 2020/0178375 A1    Jun. 4, 2020

(30) Foreign Application Priority Data

May 16, 2017   (EP) .................................... 17171196

(51) Int. Cl.
*G05F 1/00*      (2006.01)
*H05B 47/12*    (2020.01)
(Continued)

(52) U.S. Cl.
CPC ............. *H05B 47/12* (2020.01); *G01D 21/02* (2013.01); *G01H 3/12* (2013.01); *G01S 5/18* (2013.01); *H05B 47/175* (2020.01)

(58) Field of Classification Search
CPC combination set(s) only.
See application file for complete search history.

(56) References Cited

U.S. PATENT DOCUMENTS

2010/0204841 A1   8/2010  Chemel et al.
2015/0287421 A1  10/2015  Benway et al.
2016/0374133 A1* 12/2016  Logue .................. G08B 25/001

FOREIGN PATENT DOCUMENTS

CN    101308616 A   11/2008
CN    104168296 A   11/2014
(Continued)

*Primary Examiner* — Minh D A
(74) *Attorney, Agent, or Firm* — Meenakshy Chakravorty

(57) ABSTRACT

A method (500) for monitoring sound within an environment (100) using a lighting network (300, 400) comprising a processor (26, 220), a plurality of sound sensors (32), a plurality of environmental sensors (36), and a plurality of lighting units (10), includes the steps of: obtaining (520), by at least one of the plurality of sound sensors, real-time sound data from within the environment; obtaining (530), by at least one of the plurality of environmental sensors, real-time environmental data from within the environment; combining (560) the real-time sound data, the real-time environmental data, and topographical information about the environment to create a propagation map of the sound data; and localizing (570), from the propagation map of the sound data, a source of the sound data.

15 Claims, 6 Drawing Sheets

(51) Int. Cl.
*H05B 47/175* (2020.01)
*G01D 21/02* (2006.01)
*G01H 3/12* (2006.01)
*G01S 5/18* (2006.01)

(56) References Cited

FOREIGN PATENT DOCUMENTS

| | | |
|---|---|---|
| CN | 105788295 A | 7/2016 |
| CN | 105930923 A | 9/2016 |
| EP | 1913346 A1 | 4/2008 |
| EP | 2755003 A1 | 7/2014 |
| EP | 3073807 A1 | 9/2016 |
| WO | 2007012146 A1 | 2/2007 |
| WO | 2016084445 A1 | 6/2016 |

* cited by examiner

NOISE-FLOW MONITORING AND SOUND LOCALIZATION VIA INTELLIGENT LIGHTING

CROSS-REFERENCE TO PRIOR APPLICATIONS

This application is the U.S. National Phase application under 35 U.S.C. § 371 of International Application No. PCT/EP2018/061562, filed on May 4, 2018, which claims the benefit of European Patent Application No. 17171196.3, filed on May 16, 2017. These applications are hereby incorporated by reference herein.

FIELD OF THE INVENTION

The present disclosure is directed generally to methods and lighting systems configured to monitor environmental conditions, and more specifically, to lighting network configured to localize sounds and monitor noise propagation within the network.

BACKGROUND

Studies have shown that long-term exposure to noise may account for a significant number of deaths associated with heart disease and stress. Accordingly, autonomous real-time monitoring of noise pollution data is of high priority to local governments to get a better understanding of the city health and to help decision-makers take appropriate action.

Typically noise monitoring systems comprise microphone sensor networks within the city infrastructure to provide granular noise maps of the city. The main noise indicator for noise mapping is long-term averaged sound levels, typically determined over the course of a year. After results are obtained, spatial interpolation can then be applied to the data using a geographic information system in order to provide a noise map.

To obtain accurate noise maps or noise localization, acoustic consultants face strong challenges in combining empirical models with direct measurements while catering to the physics of propagation of sound outdoors using models such as digital elevation models, digital surface models, and digital terrain models. Additionally, outdoor sound propagation is affected by factors such as traffic, ground configuration, terrain profile, obstacles, pressure, wind, turbulence, temperature, humidity, and more. Traffic noise, for example, is highly dependent upon volume, speed, and the type of vehicle. Other conditions affecting traffic noise include defective mufflers, steep grades, terrain, vegetation, distance from the roadway, and shielding by barriers and buildings. These real-time scene dynamics are typically not measured by the monitoring system, and thus are not available to acoustic consultant, thereby reducing the accuracy of the noise map and/or localization.

Accordingly, there is a continued need in the art for sensor-integrated lighting networks configured for sound localization and mapping systems utilizing real-time scene dynamics.

SUMMARY OF THE INVENTION

The present disclosure is directed to inventive methods and apparatus for a lighting network configured to monitor, map, and/or localize sound within an environment. Various embodiments and implementations herein are directed to a networked lighting system comprising multiple distributed lighting units, such as streetlights, each with an integrated sound sensor configured to obtain real-time sound data from within the environment. The networked lighting system also comprises a plurality of environmental sensors configured to obtain real-time environmental data from within the environment. The lighting system combines real-time sound data, real-time environmental data, and topographical information about the environment to create a propagation map of the sound data. The system can then localize a source of sound using the generated propagation map. According to an embodiment, the information can be utilized to modify light emitted by one or more lighting units, among many other uses.

Generally, in one aspect, a method for monitoring sound within an environment using a lighting network comprising a processor, a plurality of sound sensors, a plurality of environmental sensors, and a plurality of lighting units is provided. The method includes the steps of: (i) obtaining, by at least one of the plurality of sound sensors, real-time sound data from within the environment; (ii) obtaining, by at least one of the plurality of environmental sensors, real-time environmental data from within the environment; (iii) combining, using the processor, the real-time sound data, the real-time environmental data, and topographical information about the environment to create a propagation map of the sound data; and (iv) localizing, from the propagation map of the sound data, a source of the sound data.

According to an embodiment, the method further includes the step of modifying, based on the created propagation map and/or localized source of the sound data, a light source of one or more of the lighting units.

According to an embodiment, the method further includes the step of obtaining topographical information about the environment.

According to an embodiment, the method further includes the step of comparing the real-time sound data to a predetermined threshold.

According to an embodiment, the method further includes the step of updating the lighting network with the created propagation map.

According to an embodiment, the method further includes the step of communicating the created propagation map and/or localized source of the sound data.

According to an aspect a lighting network configured to monitor sound within an environment is provided. The lighting network includes: a plurality of lighting units each comprising a light source; a plurality of sound sensors each configured to obtain real-time sound data from within the environment; a plurality of environmental sensors each configured to obtain real-time environmental data from within the environment; and a processor configured to: (i) combine the real-time sound data, the real-time environmental data, and topographical information about the environment to create a propagation map of the sound data; and (ii) localize, from the propagation map of the sound data, a source of the sound data.

According to an embodiment, at least some of the plurality of lighting units each comprise at least one of the plurality of sound sensors and at least one of the plurality of environmental sensors.

According to an embodiment, the processor is further configured to modify, based on the created propagation map and/or localized source of the sound data, a light source of one or more of the lighting units.

According to an embodiment, the processor is further configured to compare the real-time sound data to a predetermined threshold.

According to an embodiment, the processor is further configured to communicate the created propagation map and/or localized source of the sound data.

According to an embodiment, the lighting network further includes a central hub in communication with each of the lighting units, the plurality of sound sensors, and the plurality of environmental sensors, wherein the central hub comprises the processor.

According to an aspect, a lighting unit configured to monitor sound within an environment is provided. The lighting unit includes: a light source configured to illuminate at least a portion of the environment; a sound sensor configured to obtain real-time sound data from within the environment; an environmental sensor configured to obtain real-time environmental data from within the environment; and a processor configured to: (i) combine the real-time sound data, the real-time environmental data, and topographical information about the environment to create a propagation map of the sound data; and (ii) localize, from the propagation map of the sound data, a source of the sound data.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radio luminescent sources, and luminescent polymers.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a lighting system configured to create a propagation map of sound data within an environment. More generally, Applicant has recognized and appreciated that it would be beneficial to provide a lighting unit, fixture, network, and system configured to monitor sound within an environment. A particular goal of utilization of certain embodiments of the present disclosure is to localize sound within the environment, and modify lighting and/or provide warnings or other information if the sound exceeds a predetermined threshold.

In view of the foregoing, various embodiments and implementations are directed to a distributed lighting system network comprising a plurality of lighting units each with an integrated sound sensor configured to obtain real-time sound data from within the environment. The system also includes a plurality of environmental sensors configured to obtain real-time environmental data from within the environment. The distributed lighting system network combines the real-time sound data, the real-time environmental data, and topographical information about the environment to create a propagation map of the sound data and/or localize the source of the sound data.

Figure 1:
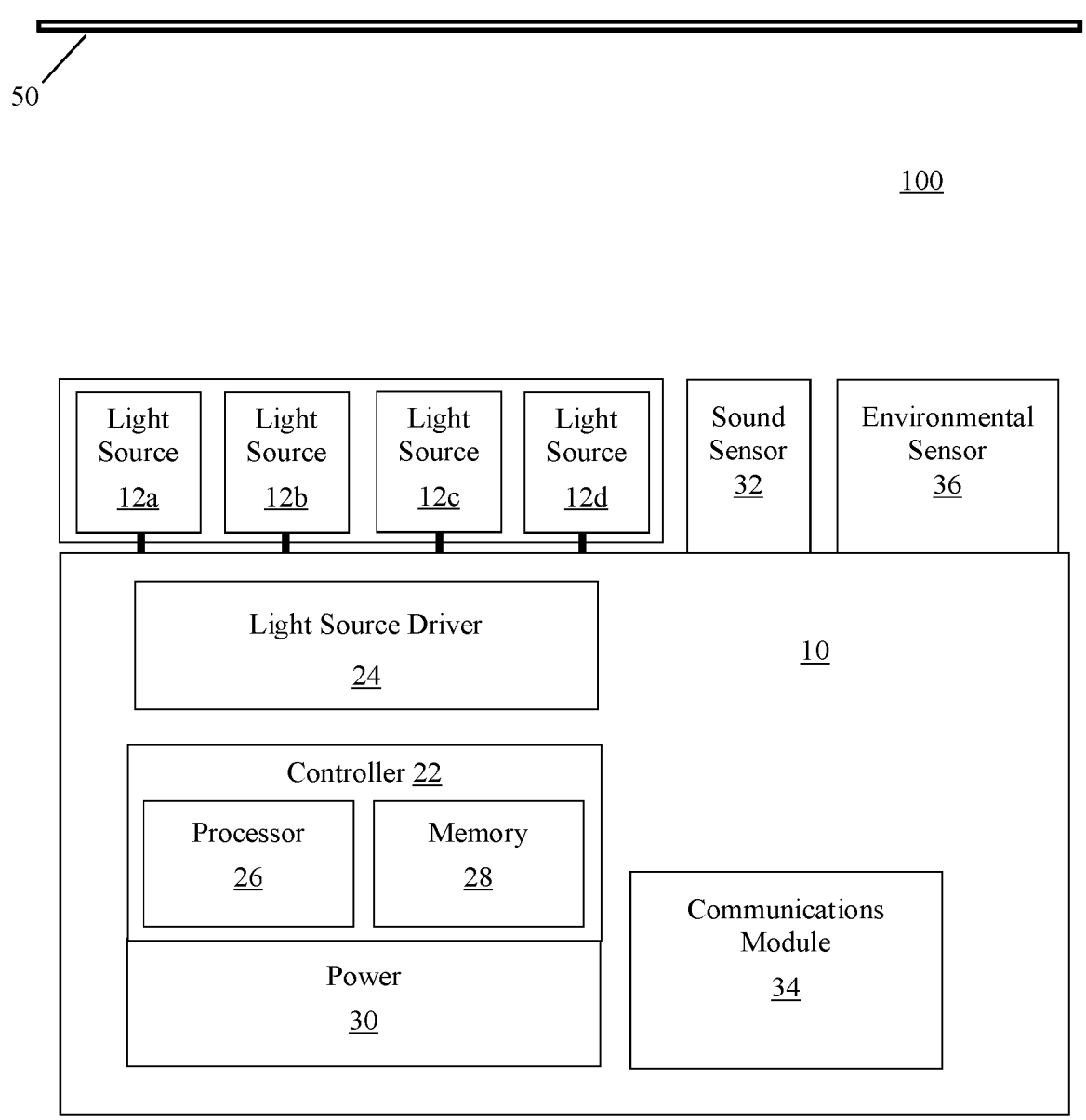
FIG. 1 is a schematic representation of a lighting unit comprising integrated sound and environmental sensors, in accordance with an embodiment.

Referring to FIG. 1, in one embodiment, a lighting unit 10 is provided that includes one or more light sources 12, where one or more of the light sources may be an LED-based light source. Further, the LED-based light source may have one or more LEDs. The light source can be driven to emit light of predetermined character (i.e., color intensity, color temperature) by one or more light source drivers 24. Many different numbers and various types of light sources (all LED-based light sources, LED-based and non-LED-based light sources alone or in combination, etc.) adapted to generate radiation of a variety of different colors may be employed in the lighting unit 10. According to an embodiment, lighting unit 10 can be any type of lighting fixture, including but not limited to a night light, a street light, a table lamp, or any other interior or exterior lighting fixture. According to an embodiment, lighting unit 10 is configured to illuminate all or a portion of a target surface 50 within a lighting environment 100. Lighting environment 100 can be a room, building, campus, street, city, portion of a city, or any other lighting environment. For example, according to an embodiment, the lighting environment 100 is a city comprising a plurality of lighting units 10.

According to an embodiment, lighting unit 10 includes a controller 22 that is configured or programmed to output one or more signals to drive the one or more light sources 12a-d and generate varying intensities, directions, and/or colors of light from the light sources. For example, controller 22 may be programmed or configured to generate a control signal for each light source to independently control the intensity and/or color of light generated by each light source, to control groups of light sources, or to control all light sources together. According to another aspect, the controller 22 may control other dedicated circuitry such as light source driver 24 which in turn controls the light sources so as to vary their intensities. Controller 22 can be or have, for example, a processor 26 programmed using software to perform various functions discussed herein, and can be utilized in combination with a memory 28. Memory 28 can store data, including one or more lighting commands or software programs for execution by processor 26, as well as various types of data including but not limited to specific identifiers for that lighting unit. For example, the memory 28 may be a non-transitory computer readable storage medium that includes a set of instructions that are executable by processor 26, and which cause the system to execute one or more of the steps of the methods described herein.

Controller 22 can be programmed, structured and/or configured to cause light source driver 24 to regulate the intensity and/or color temperature of light source 12 based on predetermined data, such as ambient light conditions or sound data, among others, as will be explained in greater detail hereinafter. According to one embodiment, controller 22 can also be programmed, structured and/or configured to cause light source driver 24 to regulate the intensity and/or color temperature of light source 12 based on communications received by a wireless communications module 34.

Lighting unit 10 also includes a source of power 30, most typically AC power, although other power sources are possible including DC power sources, solar-based power sources, or mechanical-based power sources, among others. The power source may be in operable communication with a power source converter that converts power received from an external power source to a form that is usable by the lighting unit. In order to provide power to the various components of lighting unit 10, it can also include an AC/DC converter (e.g., rectifying circuit) that receives AC power from an external AC power source 30 and converts it into direct current for purposes of powering the light unit's components. Additionally, lighting unit 10 can include an energy storage device, such as a rechargeable battery or capacitor, that is recharged via a connection to the AC/DC converter and can provide power to controller 22 and light source driver 24 when the circuit to AC power source 30 is opened.

In addition, lighting unit 10 includes a sound sensor 32 which is connected to an input of controller 22 and collects sound data from within the vicinity of lighting unit 10 and can transmit data to controller 22, or externally via communications module 34, that is representative of the sound data it collects. According to an embodiment, the sound sensor is a microphone configured to obtain ambient sound data from the environment 100. For example, in a city setting, the lighting unit may be a streetlight positioned along a street and be configured to illuminate a portion of that street. The lighting unit may comprise a microphone configured to obtain sound data at that streetlight, including but not limited to traffic that passes along the street, among many other sounds.

Lighting unit 10 also includes an environmental sensor 36 configured to obtain real-time environmental data from within the vicinity of lighting unit 10. The environmental sensor 36 is connected to an input of controller 22 and can transmit data to controller 22, or externally via communications module 34, that is representative of the environmental data it collects. According to an embodiment, the environmental sensor collects one type of environmental data, or many types of environmental data.

According to an embodiment, environmental sensor 36 collects real-time data such as temperature, wind speed, barometric pressure, humidity, and/or any of a variety of other environmental factors. Accordingly, the environmental sensor 36 may be any of a thermometer, anemometer, barometer, hygrometer, and/or any of a variety of other others sensors.

According to another embodiment, environmental sensor 36 collects real-time data such as traffic data. For example, environmental sensor 36 may be a two-dimensional camera, time-of-flight sensing element, three-dimensional camera, thermal camera, thermopile sensory array, and/or any type of sensor capable of detecting real-time data such as traffic data. For example, the environmental sensor 36 may obtain information sufficient for the system to classify traffic or objects, such as vehicle type and/or size, and/or to monitor traffic behaviour such as speed, direction, and/or location. Details of camera, thermopile, and time-of-flight based sensing will be familiar to a person skilled in the art, and are not described in any further detail herein.

Figure 2:
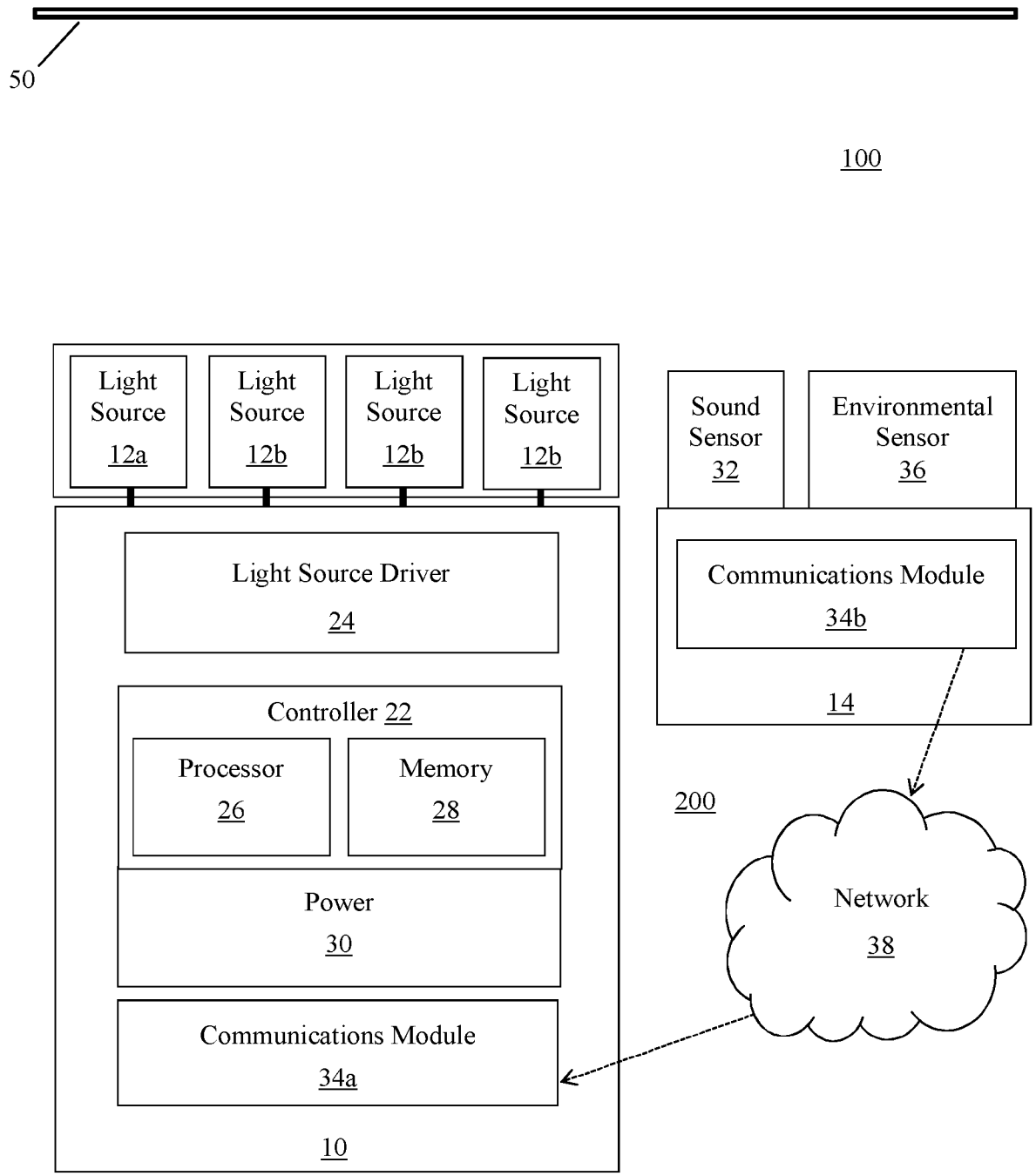
FIG. 2 is a schematic representation of a lighting system comprising a lighting unit and separate sound sensor and environmental sensor, in accordance with an embodiment.

Referring to FIG. 2, in one embodiment, is lighting system 200 comprising a lighting unit 10 with one or more light sources 12. In some embodiments, sound sensor 32 and/or environmental sensor 36 are located within the lighting system remotely from a lighting unit 10, and transmits obtained sensor data to a lighting unit and/or a central component of the lighting system.

According to an embodiment, the lighting system comprises one or more sensor modules 14 each comprising: (i) a sound sensor 32; (ii) an environmental sensor 36; or (iii) both a sound sensor and an environmental sensor. For example, each lighting unit 10 within the lighting environment may comprise an associated, but remotely located, sensor module. The one or more sensor modules 14 each comprise a wired and/or wireless communications module 34*b* configured to communicate the obtained sensor data to a lighting unit 10, and/or to a central component of the lighting system (described in greater detail in FIG. 4). The communications module 34*b* may communicate with another component of the lighting system via wired and/or wireless communication. According to an embodiment, the communications module 34*b* is in wired communication with an associated lighting unit 10. According to another embodiment, the communications module 34*b* is in wired communication with a central hub of the lighting system. The communications module 34*b* may also or alternatively communicate with a lighting unit or a central hub of the lighting system via a network 38, which can be any network such as a cellular network, or any of a variety of other networks. Communication within the network can be, for example, Wi-Fi, Bluetooth, IR, radio, or near field communication, among many others.

Figure 3:
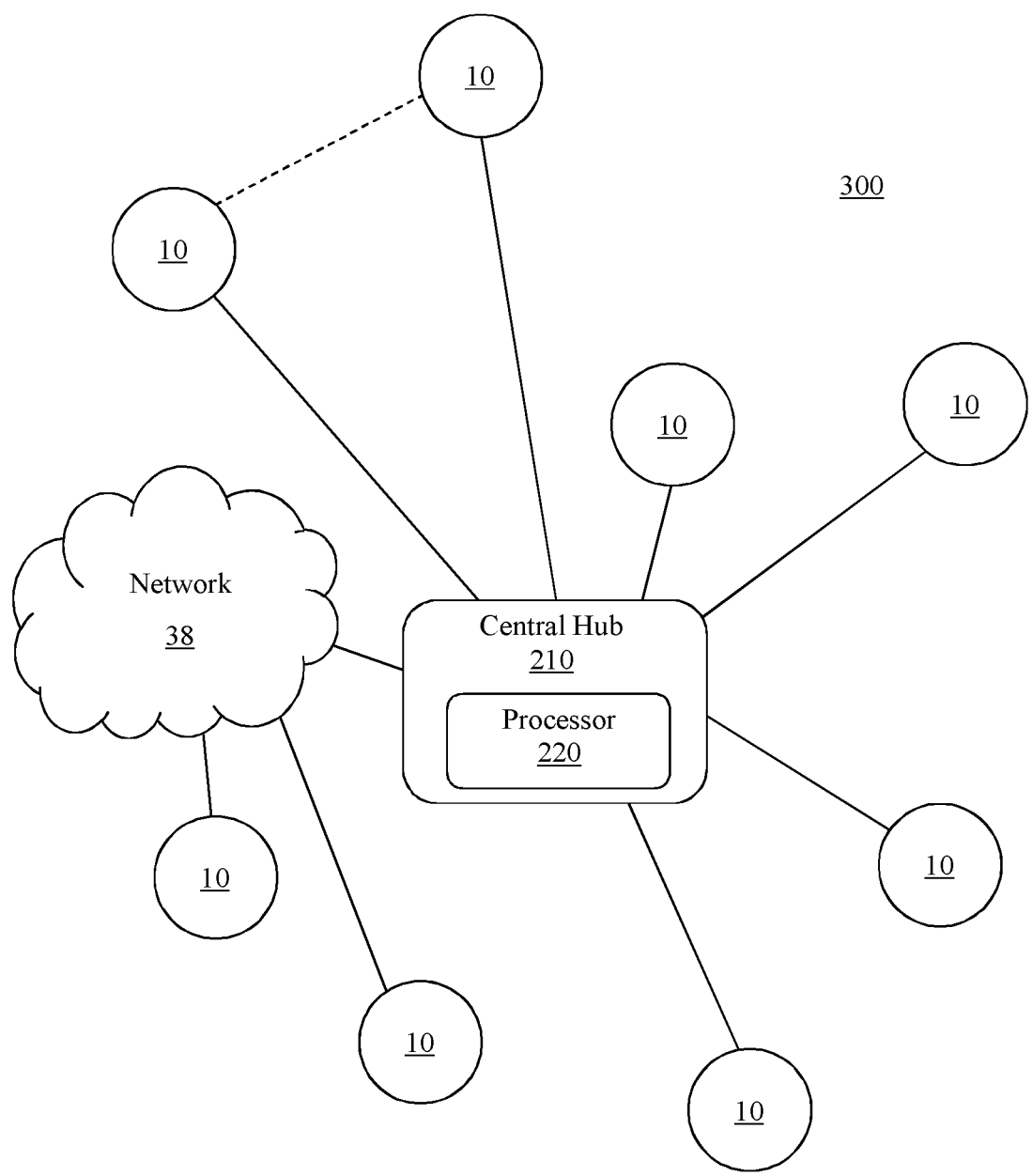
FIG. 3 is a schematic representation of a distributed lighting system network, in accordance with an embodiment.

Referring to FIG. 3, in one embodiment, is a distributed lighting system network 300 comprising a plurality of lighting units 10 each with an integrated sound sensor 32 configured to obtain real-time sound data from within the vicinity of lighting unit 10, and an integrated environmental sensor 36 configured to obtain real-time environmental data from within the vicinity of lighting unit 10. The lighting units can be any of the embodiments described herein or otherwise envisioned, and can include any of the components of the lighting units described in conjunction with FIG. 1, such as one or more light sources 12, light source driver 24, controller 22, and wireless communications module 34, among other elements. The lighting units may communicate to and/or receive information from another lighting unit 10, a network 38, and/or a central computer, server, or other central hub 210. One or more aspects of the functionality of the methods and systems described or otherwise envisioned herein may occur within the central hub 210 rather than within the individual lighting units. For example, the central hub may extract information from data captured by one or more lighting units and transmitted or otherwise communicated to the central hub. According to an embodiment, lighting network 300 comprises a central processor 220, which can perform one or more functions of the system. For example, the central hub 210 can comprise a processor 220.

According to an embodiment, the distributed lighting system network 300 comprises a town, village, city, street, parking lot, or any other location. The network may comprise one lighting unit or many thousands of lighting units. The network may be implemented in a rural setting, suburban setting, urban setting, or a combination thereof.

Figure 4:
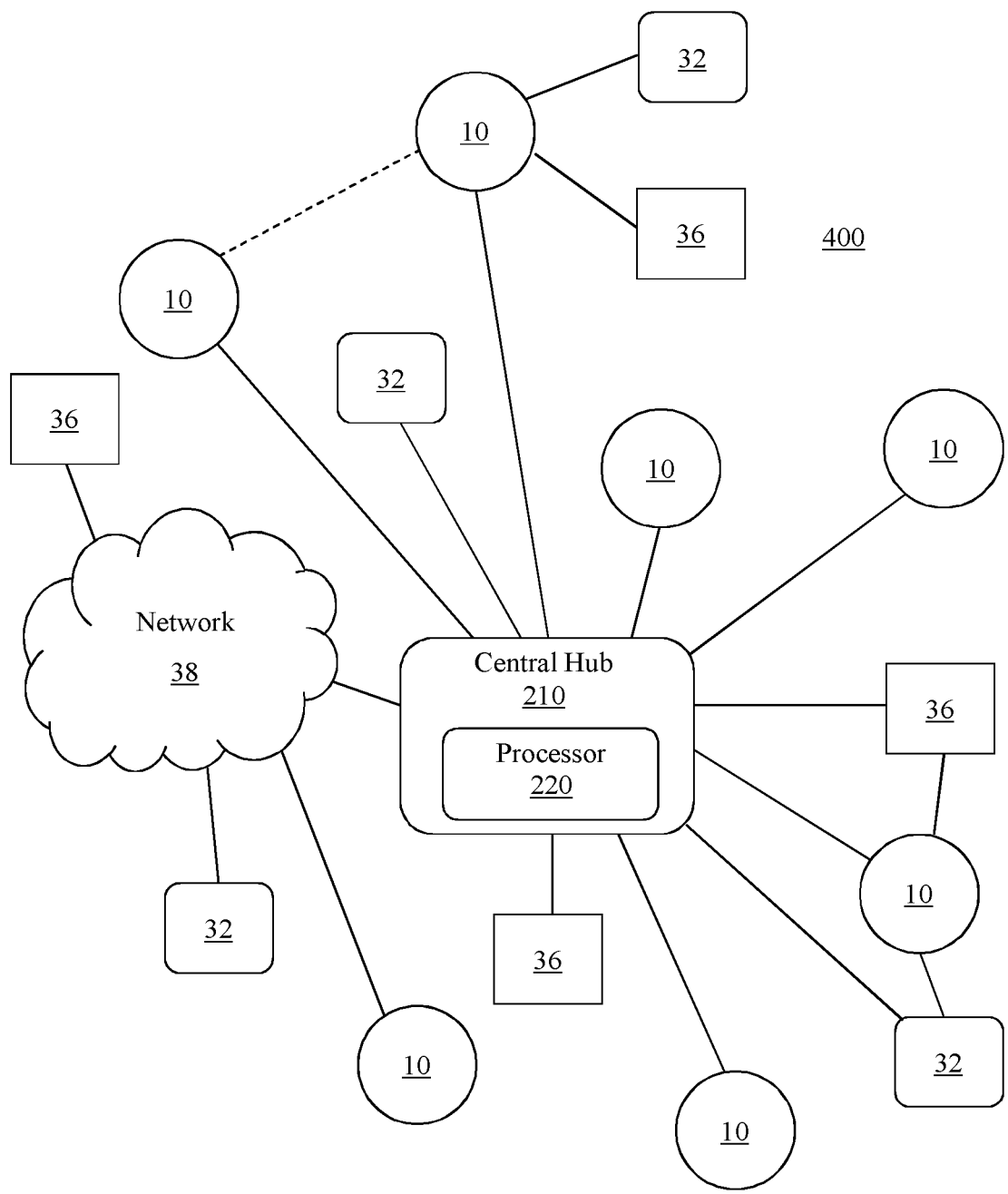
FIG. 4 is a schematic representation of a distributed lighting system network, in accordance with an embodiment.

Referring to FIG. 4, in one embodiment, is a distributed lighting system network 400 comprising a plurality of lighting units 10. The lighting units can be any of the embodiments described herein or otherwise envisioned, and can include any of the components of the lighting units described in conjunction with FIG. 1, such as one or more light sources 12, light source driver 24, controller 22, and wireless communications module 34, among other elements. The lighting units may communicate to and/or receive information from another lighting unit 10, a network 38, and/or a central computer, server, or central hub 210.

Lighting system network 400 also comprises a plurality of sound sensors 32 each configured to obtain real-time sound data from within the vicinity of lighting unit 10, and a plurality of environmental sensors 36 each configured to obtain real-time environmental data from within the vicinity of lighting unit 10. In contrast to lighting system network 300 in FIG. 3, at least some of the sound sensors 32 and/or the environmental sensors 36 are separate from the plurality of lighting units 10 of the network. A sound sensor 32 and environmental sensor 36 may be separate components, or may be integrated in a sensor module 14. The sensor module and/or the individual sensors may communicate to and/or receive information from a lighting unit 10, a network 38, and/or a central computer, server, or other central hub 210. The distributed lighting system network 300 may be located within a town, village, city, street, parking lot, or any other location, and may comprise one lighting unit or many thousands of lighting units.

Figure 5:
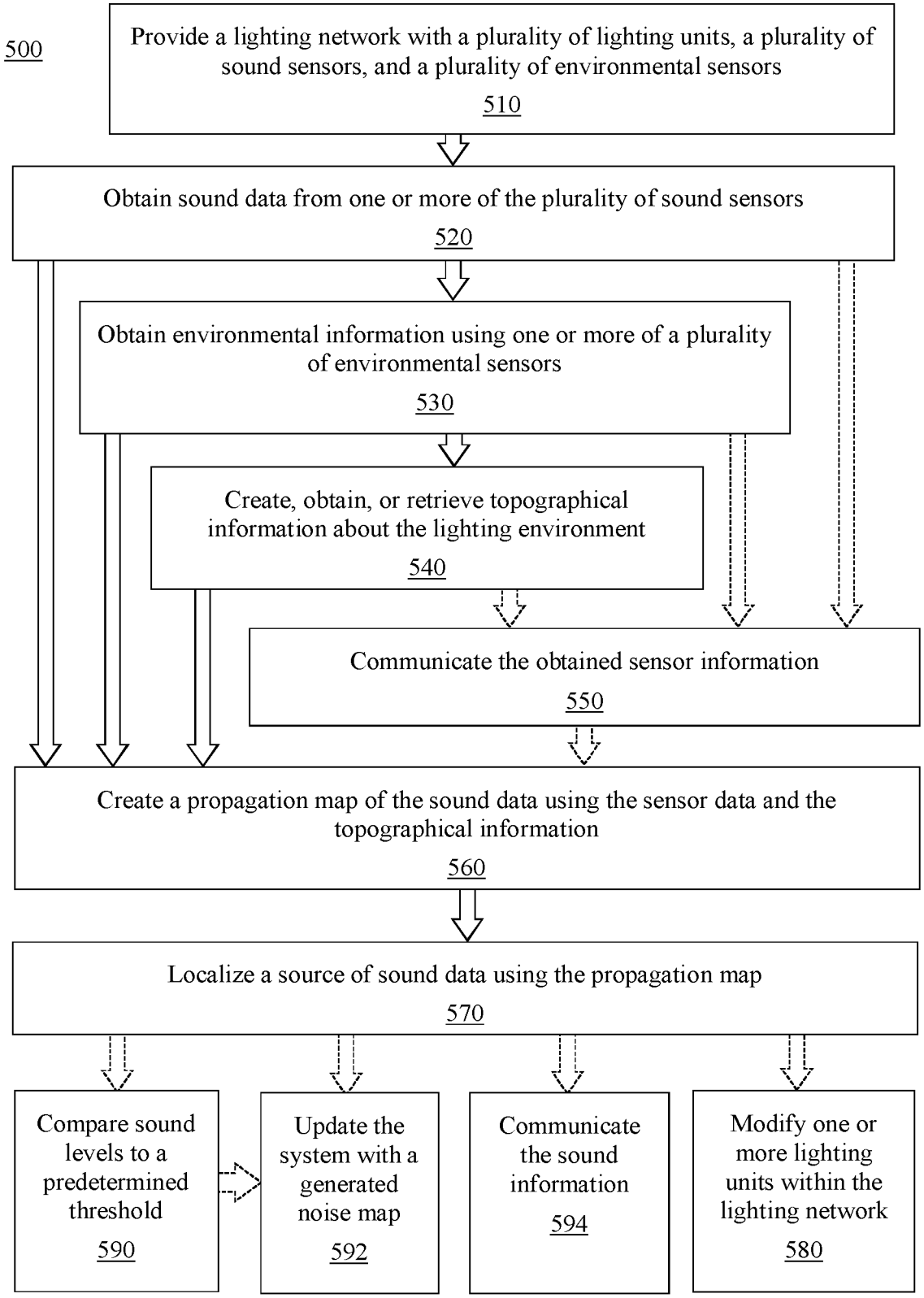
FIG. 5 is a flowchart of a method for monitoring sound within a lighting environment, in accordance with an embodiment.

Referring to FIG. 5, in one embodiment, is a flowchart illustrating a method 500 for monitoring sound by a distributed lighting network within an environment. At step 510 of the method, a lighting system network 200, 300, 400 comprising a plurality of lighting units 10 is provided. Lighting unit 10 can be any of the embodiments described herein or otherwise envisioned, and can include any of the components of the lighting units described in conjunction with FIGS. 1 and 2, such as one or more light sources 12, light source driver 24, controller 22, sensor 32, and wireless communications module 34, among other elements. According to an embodiment, each lighting unit 10 is configured to illuminate all or a portion of a target surface 50. Each lighting unit illuminates all or a portion of the target surface 50. According to one embodiment, the lighting unit is an outdoor lighting fixture such as a streetlight, parking lot light, or other lamp post or external lighting fixture configured to illuminate a target surface. The lighting unit may automatically illuminate the lighting environment during a predetermined period, or may be activated and deactivated by activity. According to another embodiment, the lighting unit can detect ambient light levels and based on a predetermined threshold can activate and deactivate the light sources.

The lighting system network also comprises a plurality of sound sensors 32 each configured to obtain real-time sound data from within the vicinity of lighting unit 10, and a plurality of environmental sensors 36 each configured to obtain real-time environmental data from within the vicinity of lighting unit 10. A sound sensor and/or an environmental sensor may be integral to a lighting unit, or may be separate from the plurality of lighting units 10 of the network. A sound sensor 32 and environmental sensor 36 may be separate components, or may be integrated in a sensor module 14. The sensor module and/or the individual sensors may communicate to and/or receive information from a lighting unit 10, a network 38, and/or a central computer, server, or other central hub 210.

At step 520 of the method, one or more of the sound sensors 32 within the lighting network obtains sound data from within the lighting environment. The sound sensor can be, for example, any sound sensor capable of obtaining sound data from within the lighting environment, such as a microphone. The sound sensor communicates the sound data to the controller 22, where the information can be analyzed and/or can be stored within memory 28. According to one embodiment, the sound sensor communicates or controller 22 communicates the sound data to a central hub for analysis.

At step 530 of the method, one or more of the environmental sensors 36 within the lighting network obtains environmental data from within the lighting environment. The environmental sensor can be, for example, any sound sensor capable of obtaining environmental data from within the lighting environment, including the sensors described and/or otherwise envisioned herein. The environmental sensor communicates the environmental data to the controller 22, where the information can be analyzed and/or can be stored within memory 28. According to one embodiment, the environmental sensor communicates or controller 22 communicates the environmental data to a central hub for analysis.

The one or more of the sound sensors 32 and the one or more environmental sensors 36 can be configured to obtain sensor data as desired or necessary. For example, the sensors may obtain data continuously, or the sensors may obtain data periodically, such as once every minute or multiple times per minute, among many other periods of time. According to another embodiment, sensor 32 and/or sensor 36 can be configured to obtain sensor information in response to a trigger, and/or the frequency of sampling can be increased in response to the trigger. For example, the sensors may be configured to obtain sensor data at a higher sampling rate during daylight or business hours, and/or configured to obtain sensor data at a lower sampling rate during non-daylight or non-business hours. The frequency may also vary by day of the week and/or time of year. For example, the system may be configured to obtain sensor data at a higher sampling rate or fidelity during expected high traffic hours, peak construction hours, or during any other time frame. According to an embodiment, the system may be configured to collect sensor data in response to sound above a certain predetermined or pre-programmed threshold. For example, the system can be configured such that a lighting unit must detect a minimum threshold of a triggering event, such as a certain number of sounds or other minimum threshold in order to minimize false triggering. The system may also be configured such that a minimum number of lighting units in a lighting network or within a sector of a lighting network are triggered before other lighting units or the lighting network is notified and/or triggered.

At step 540 of the method, the system creates, obtains, receives, or retrieves from memory topographical information about the environment 100. The topographical information may comprise, for example, a location within the environment for each of the lighting units, sound sensors, and/or environmental sensors. For example, each lighting unit and/or sensor within the network may comprise a unique identifier that is associated with a predetermined or pre-programmed location, and the topographical information may comprise this location information. Topographical information may be stored within each lighting unit, and/or may be stored within a central hub, processor, or memory of the lighting system. According to an embodiment, topographical information may comprise one or more digital elevation models, digital surface models, and/or digital terrain models. The information may include data regarding permanent structures such as buildings, or semi-permanent structures such as construction machinery, displays, exhibits, or other types of structures.

According to one embodiment, the lighting system creates topographical information about the lighting environment using data from obtained from one or more of the sound and/or environmental sensors. For example, the lighting system may utilize sound data to create a two-dimensional or three-dimensional map of all or a portion of the lighting environment. According to another embodiment, the lighting system utilizes three-dimensional information about traffic or other environmental factors to create topographical information about the lighting environment.

At optional step 550 of the method, the obtained sensor information and/or topographical information is communicated. For example, the sensors and/or lighting units may communicate with other sensors, other lighting units, and/or a central hub directly by wired and/or wireless communication. Alternatively, the sensors and/or lighting units may communicate with other sensors, other lighting units, and/or a central hub via a network 38, which can be any network such as a cellular network, or any of a variety of other networks. Communication within the network can be, for example, Wi-Fi, Bluetooth, IR, radio, or near field communication, among many others.

Figure 6:
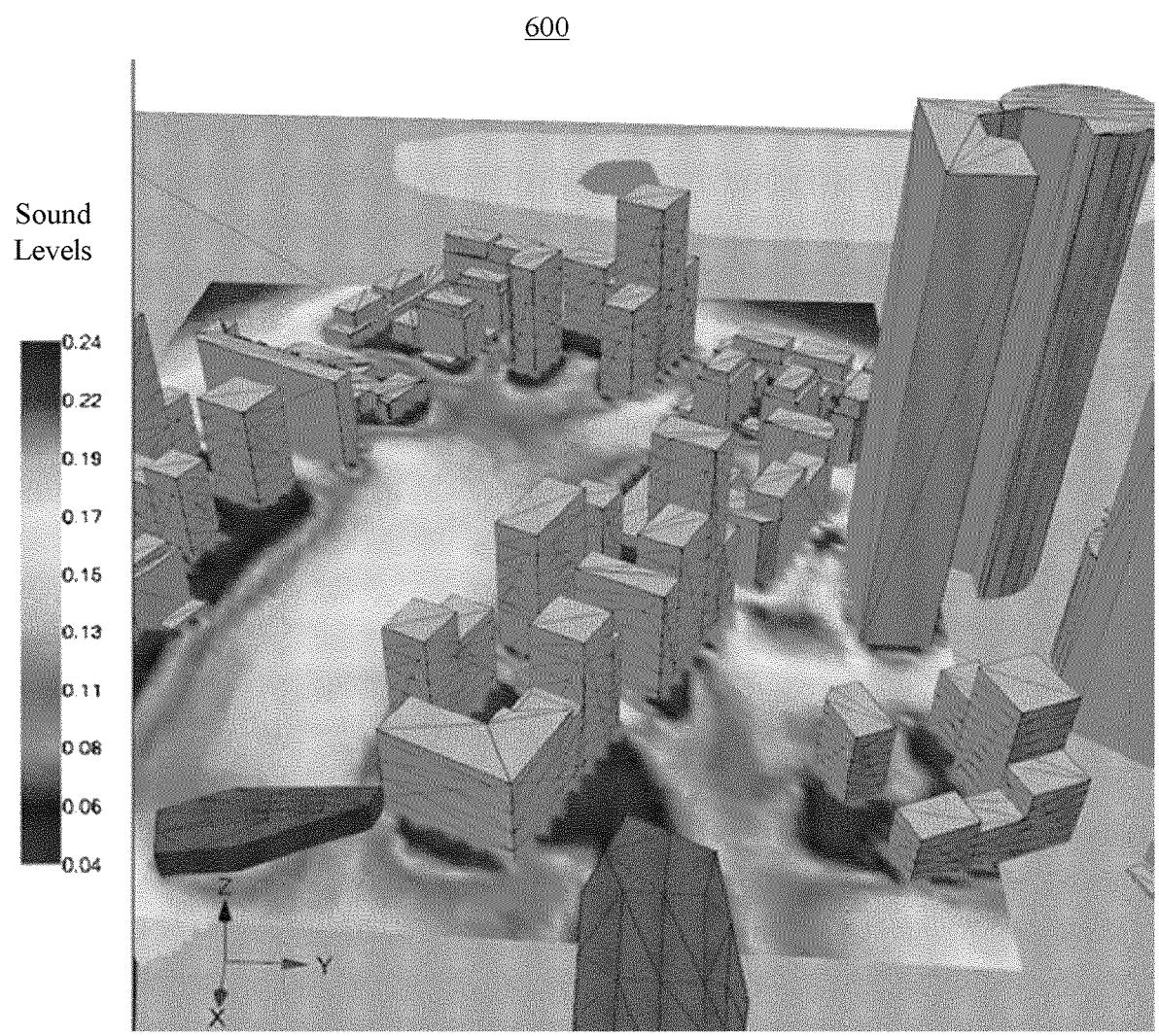
FIG. 6 is a schematic representation of a sound propagation map, in accordance with an embodiment.

At step 560 of the method, the system combines the obtained real-time sound data, the obtained real-time environmental data, and the topographical information about the environment to create a propagation map of the sound data. Referring to FIG. 6, in one embodiment, is a schematic representation of a propagation map 600 of sound data within a lighting environment 100.

At step 570 of the method, the system localizes, from the propagation map of the sound data, a source of the sound data. The system may also identify the lighting units within the lighting system closes to a source of a particular sound or sound event.

At optional step 580 of the method, the lighting network responds to the propagation map and/or source of the sound data. For example, one or more lighting units 10 may respond or be directed to respond by modifying a light source, displaying an alerting light, or any other possible response. For example, light modification may comprise, among other things, changes in the light spectrum (intensity/hue) or beam profile, such as a flashing red light or other alert. As another example, the lighting unit may actively project information on the surface of a road or other surface. Many other modifications of the lighting unit and/or other response methods are possible. The lighting network may respond to the propagation map and/or source of the sound data by modifying one lighting unit such as the lighting unit(s) closest to the source of the sound. The lighting network may respond to the propagation map and/or source of the sound data by modifying lighting units along the path of the sound propagation. Alternatively, the lighting network may respond to the propagation map and/or source of the sound data by modifying all the lighting units within the network. Many other configurations are possible.

At optional step 590 of the method, measured sound levels are compared to one or more predetermined sound level thresholds. The thresholds may be stored by a processor of and/or in memory associated with the sound sensor or sensor module, or may be stored in a memory of the lighting unit and/or the lighting system. Accordingly, the sound levels may be compared to a threshold after the sound level data is communicated to another component of the system. The threshold comparison may be performed immediately, or may be performed with stored sound level data. Thresholds can be variable by location, by time, by day of the week, by season, and by other variables. For example, some thresholds may be higher where there is less dense population, while thresholds may be lower in high-density population areas. As another example, thresholds may be higher during the day and lower at night.

According to another embodiment of the method, the system determines that there are localized sound levels that are within comfortable levels compared to one or more predetermined thresholds, but combine with localized sound levels in one or more other areas to produce sound levels that exceed thresholds. The system may then produce an alert in an area that has a sound level below threshold.

At optional step 592 of the method, the lighting network generates a noise map of the environment 100 using the generated propagation map and/or determined source of the sound data. The noise map may comprise, for example, an indication of sound levels across at least a portion of the environment, including sound levels at specific areas within the environment based on determinations of the source of sound data. Areas of high sound levels where sound data exceeds the predetermined thresholds as determined in step 590 of the method can be indicated using flags, colors, sound level labels (such as decibels), and/or any other suitable indication. The lighting system can be updated with the generated noise map, and/or the noise map can be communicated to a central hub or to another remote component or recipient.

At optional step 594 of the method, the lighting network communicates the generated propagation map, determined source of the sound data, and/or generated noise map to a central hub, a remote server, a management center, and/or to another remote location. For example, the communicated information may be analysed, stored, or otherwise reviewed or processed remotely from the lighting system.

According to another embodiment, the lighting network communicates the generated propagation map, determined source of the sound data, and generated noise map, and/or other obtained or generated information to a source of sound. For example, the lighting network communicates sound data, such as a warning that sound data exceeds a predetermined limit, to an individual suspected of generated the sound. This may comprise, for example, determining the source of the sound data and determining that the sound data exceeds a predetermined threshold. The communication may be direct, such as through the individual's radio, smartphone, wearable device, computerized device, and/or any other display. The communication may be indirect, such as through a modification of a light source near the source of the sound, including flashing lights, red lights, or information displayed by the light on a road, building, or other surface.

According to another embodiment, the system detects sound propagating through the environment and determines that it is likely a vehicle driving through the environment at a speed that produces excessive noise. The system warns the user to reduce the vehicle speed and thus reduce the propagated noise of the vehicle so that noise pollution stays within proscribed limits.

According to another embodiment, the system detects sound propagating through the environment and determines that it is likely a vehicle driving through the environment. The system may then modify one or more lighting units within the system, and based on the predicted route that the vehicle is expected to take based on previous determined propagation (either for the vehicle itself or for one or more previous vehicles), can update the lighting network to modify light sources along the predicted path of the vehicle. Additionally, the system can update the lighting network with information about potential obstacles that contribute to sound flow measurement across the network.

According to an embodiment of the method, one or more sensors of the lighting system monitors the presence and/or one or more surface properties of a stationary or moving obstacle within the system. For example, a multispectral sensor such as a 2D/3D time-of-flight camera can detect the presence and/or one or more surface properties of a stationary or moving obstacle. The system can utilize that information to recalculate the propagation map based in part on the detected obstacle, since obstacles will affect the propagation of sound within the environment. The obstacle information can be augmented with digital elevation information from available DEM/DSM models, as well as with other information.

According to another embodiment of the method, a sensor of the lighting system monitors one or more surface or terrain properties of one or more surfaces within the environment. This surface or terrain property can be periodically or continuously monitored by the system, and can be utilized to update GIS and/or other databases when a change in property is detected. For example, a change in road conditions (road layout changed, new layer of asphalt laid, etc.) can be detected and utilized to update GIS and/or other databases.

According to yet another embodiment of the method, weather conditions can be monitored by one or more of the environmental and/or sound sensors, and that information can be utilized to update a propagation or other sound map of the environment. For example, road surfaces with stagnant water, with snow, or with other weather-related conditions may influence propagation maps or other sound maps of the environment.

According to an embodiment of the method, the system can be calibrated using known sound levels, such as observation of test tones generated by calibrated equipment. For example, sound sensors within the system can be calibrated using a controlled or known sound source such as typical 94 dB tone generator for instance which can be initiated from one or more nodes within the network. Based on the measured scene dynamics and the network topology information, the entire sensor network can accordingly be calibrated. For example, one or more lighting units within the environment may emit a known or controlled sound. As another example, a vehicle emitting a known or controlled sound may move along a known course within the environment, thereby calibrating the system and resulting in controlled propagation maps and sound source maps.

According to another embodiment, the system may be calibrated using historical data. For example, during installation the microphones can be calibrated in factory and/or on-site. As one example, the system can be calibrated using a sound level or quality similar to sound levels and quality expected to be received by the system from traffic and/or other sound sources. When the sensors are measuring lower noise levels with similar traffic, the sensors can be calibrated to adjust to compensate the reduced sensitivity.

According to another embodiment, the system may be calibrated using a relative calibration of individual microphones. For example, when a microphone along a street segment measures a sound level, and that microphone is similar to neighbouring sensors, these sensors can be utilized to calibrate each other. These and many other calibration methods are possible.

According to another embodiment of the method, sound propagation maps can be used to improve triangulation between multiple dislocated sound sensors observing a specific sound event (a gunshot for instance) covering a larger area. Taking into account known sound propagation within the environment, including occlusions and reflections resulting from surrounding buildings and other objects, the accuracy of the sound detection/localization can be improved and the number of microphones required per square km can be reduced.

According to yet another embodiment of the method, when a change to one or more sound dynamics within the environment is observed such as a change induced by weather, new terrain, or traffic the system can create a predictive estimate of the potential noise disturbance that will be observed at one or more locations within the environment. This information can be utilized to, for example, optimize scheduling of specific duties within the environment such as those that produce noise disturbances like road construction, controlled demolitions, and other known disturbances.

According to an embodiment of the method, the system can communicate obtained and/or generated information to authorities or other entities within the environment to alert them of traffic information such as severe traffic jams or completely empty roads for instance, based on measured sound. This provides information about potential sound hot-spots and/or cold-spots within the environment where sound propagation is or is expected to be suppressed or amplified.

According to a further embodiment of the method, the system enables a service to users within the environment that provides an overview of sound level exposure they will experience, are experiencing, and/or have experienced as a result of a journey through the lighting environment. Similarly, the system can suggest to a user which periods of the day are the most quiet to plan outdoor activities within the environment. This information can be based on historical information, and/or can be based on real-time observations of sound and/or environmental data.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of" or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

The invention claimed is:

1. A method for monitoring sound within an environment using a lighting network comprising a processor, a plurality of environmental sensors, and a plurality of lighting units each comprising an integrated sound sensor, the method comprising the steps of:
    obtaining, by at least one of the integrated sound sensors, real-time sound data from within the environment;
    obtaining, by at least one of the plurality of environmental sensors, real-time environmental data from within the environment;
    combining, using the processor, the real-time sound data, the real-time environmental data, and topographical information about the environment to create a propagation map of the sound data; and
    localizing, from the propagation map of the sound data, a source of the sound data.

2. The method of claim 1, further comprising the step of modifying, based on the created propagation map and/or localized source of the sound data, a light source of one or more of the lighting units.

3. The method of claim 1, further comprising the step of obtaining topographical information about the environment.

4. The method of claim 1, further comprising the step of comparing the real-time sound data to a predetermined threshold.

5. The method of claim 1, further comprising the step of updating the lighting network with the created propagation map.

6. The method of claim 1, further comprising the step of communicating the created propagation map and/or localized source of the sound data.

7. A lighting network configured to monitor sound within an environment, the lighting network comprising:
    a plurality of lighting units each comprising a light source, and a sound sensor configured to obtain real-time sound data from within the environment;
    a plurality of environmental sensors each configured to obtain real-time environmental data from within the environment; and
    a processor configured to: combine the real-time sound data, the real-time environmental data, and topographical information about the environment to create a propagation map of the sound data; and localize, from the propagation map of the sound data, a source of the sound data.

8. The lighting network of claim 7, wherein at least some of the plurality of lighting units each comprise at least one of the plurality of environmental sensors.

9. The lighting network of claim 7, wherein the processor is further configured to modify, based on the created propagation map and/or localized source of the sound data, a light source of one or more of the lighting units.

10. The lighting network of claim 7, wherein the processor is further configured to compare the real-time sound data to a predetermined threshold.

11. The lighting network of claim 7, wherein the processor is further configured to communicate the created propagation map and/or localized source of the sound data.

12. The lighting network of claim 7, further comprising a central hub in communication with each of the lighting units and the plurality of environmental sensors, wherein the central hub comprises the processor.

13. A lighting unit configured to monitor sound within an environment, the lighting unit comprising:
    a light source configured to illuminate at least a portion of the environment;
    an integrated sound sensor configured to obtain real-time sound data from within the environment;
    an environmental sensor configured to obtain real-time environmental data from within the environment; and
    a processor configured to: combine the real-time sound data, the real-time environmental data, and topographical information about the environment to create a propagation map of the sound data; and localize, from the propagation map of the sound data, a source of the sound data.

14. The lighting unit of claim 13, wherein the processor is further configured to communicate the created propagation map and/or localized source of the sound data.

15. The lighting unit of claim 13, wherein the processor is further configured to modify the light source based on the created propagation map and/or localized source of the sound data.

* * * * *